United States Patent [19]
Fairchild et al.

[11] Patent Number: 5,508,985
[45] Date of Patent: Apr. 16, 1996

[54] METHOD FOR DETECTING AND PROCESSING SYNCHRONIZATION MARKS EXTRACTED FROM A PRERECORDED WOBBLED GROOVE ON A COMPACT DISK

[75] Inventors: Michael G. Fairchild, Webster; Gzim Derti, Dansville; Mark A. Barton, Rochester, all of N.Y.

[73] Assignee: Eastman Kodak Company, Rochester, N.Y.

[21] Appl. No.: 320,995

[22] Filed: Oct. 11, 1994

[51] Int. Cl.⁶ .................................................. G11B 7/00
[52] U.S. Cl. .................. 369/48; 269/50; 269/54; 269/59; 269/124
[58] Field of Search ........................ 369/58, 59, 50, 369/47, 48, 49, 54, 32, 124

[56] References Cited

U.S. PATENT DOCUMENTS 5,163,035  11/1992  Horikiri .................................. 369/47
5,363,360  11/1994  Fairchild ................................ 369/48

*Primary Examiner*—Georgia Y. Epps
*Assistant Examiner*—Muhammad N. Edun
*Attorney, Agent, or Firm*—Raymond L. Owens

[57] ABSTRACT

A method for detecting and processing synchronization marks extracted from a prerecorded wobbled groove formed in a compact disk in order to produce pseudo-sync signals using a high frequency phase locked loop servoing to the disk speed to generate the signals.

2 Claims, 7 Drawing Sheets

५,५०८,९८५

METHOD FOR DETECTING AND PROCESSING SYNCHRONIZATION MARKS EXTRACTED FROM A PRERECORDED WOBBLED GROOVE ON A COMPACT DISK

CROSS-REFERENCE TO RELATED APPLICATION

Reference is made to commonly assigned U.S. Ser. No. 08/127,218 filed Sep. 27, 1993 to Michael G. Fairchild, entitled "Method and Apparatus for Detecting and Processing Synchronization Marks Extracted From a Prerecorded Wobble Groove on a Compact Disk" the teachings of which are incorporated herein.

1. Field of the Invention

The present invention relates to the detection, processing and timing of the Absolute Time In Pregroove (ATIP) synchronization marks extracted from a wobbled groove formed in a compact disk such as a Photo CD.

2. Background of the Invention

Stamped by machine on a writable compact disk is a wobbled groove. The groove provides means for tracking on the disk while writing or reading data that is written in the groove. The wobbled groove, which is a frequency modulated signal after detection and processing, contains addressing and other information that are necessary for the write and read processes of the CD writer/reader.

Information is coded in a series of blocks, each of said blocks comprising 42 bits: four bits of a sync mark, eight bits of "minutes", eight bits of "seconds", eight bits of "frames", and fourteen bits of "CRC" (cyclic redundancy check). The sync marks are used to produce "sync detect" signals and these "sync detect" signals perform the following functions: (1) they indicate that at a particular location the prerecorded address information is to follow and this information is used to tell the CD writer/reader where the optical head is operating on the disk; and (2) they establish a reference point on the compact disk to begin a write or read sequence.

In order to work efficiently, the microprocessor which controls the writer/reader needs to be provided with an uninterrupted synchronization signal, free of invalid or missing synchronization pulses. This is obviously more critical with high speed writers. For those writers, there is an increased likelihood of noise in the detected signals which will cause synchronization marks stamped on the disk to either not be detected or to be falsely detected.

SUMMARY OF THE INVENTION

It is therefore an object of this invention to provide an efficient way to detect and process synchronization marks and address information prerecorded on a disk in order to efficiently control the operation of a high speed writer/reader.

This object is achieved in a method for detecting and processing valid sync marks and address information extracted from a prerecorded wobbled groove formed in a compact disk in order to produce pseudo-sync signals, each pseudo-sync signal enabling a writing/reading sequence on the compact disk of an associated writer/reader, the prerecorded wobbled groove having a plurality of blocks of information, the method comprising the steps of:

(a) extracting an FM signal from the wobbled groove when the disk is rotatably driven and converting such FM signal into bipbase data;

(b) extracting a biphase clock signal from the bipbase data;

(c) providing a high frequency phase-lock loop which responds to the extracted FM signal;

(d) providing an ATIP decoder which in response to the biphase data, biphase clock, and high frequency clock signal provides the following:

(i) detecting in each block of information a predetermined sequence of biphase data representing a sync mark by using the biphase clock signal and the biphase data to produce a valid sync detect signal;

(ii) generating a time window signal in which, for a given block of information, a valid sync detect signal is expected to occur, the time window signal being generated from a valid sync detect signal of the block preceding the given block and the high frequency clock from the HF PLL; and (iii) in response to a valid sync detect signal detected within the window signal of a given block of information, generating a pseudo-sync signal in the next block of information;

(iv) in the case of no valid sync detect signal within the window signal of the given block of information, generating a pseudo-sync signal for the next block of information from the last valid sync detect signal; and (e) indicating a system error when a predetermined number of sync detect signals are not detected within their corresponding time window signal.

The following are advantages of the present invention. The method according to the invention is particularly advantageous in that high speed reading and writing capabilities are permitted.

At higher rates there will be more invalid detected sync marks, but the system will compensate for these invalid detected sync marks. The present invention will permit a predetermined number of sync marks not to be detected without having to stop the writing/reading process. The present invention also improves the working frequency range by using a high frequency phase lock loop to provide a high frequency clock rather than a single frequency crystal oscillator. Other advantages will appear during the detailed description which follows.

DETAILED DESCRIPTION OF THE PREFERRED EMBODIMENTS

Figure 1:
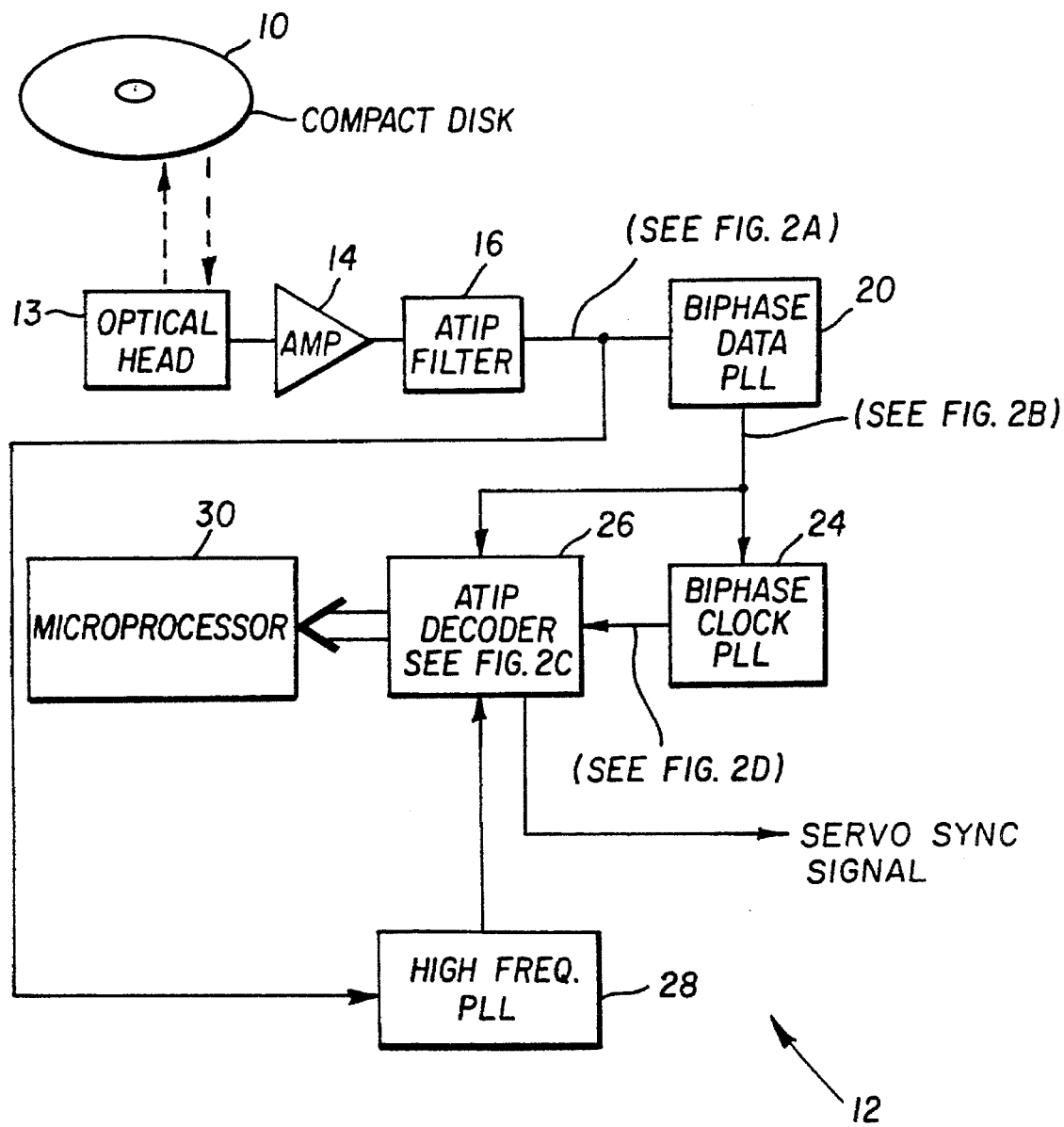
FIG. 1 is a diagram in block format of a preferred embodiment.

FIG. 1 is a block diagram in accordance with the present invention. A prerecorded spiraled wobbled pregroove, starting from the center of a CD-WO (compact disk-write once) disk 10 and extending up to the periphery of the disk 10 is read by a reader/writer 12. Typically, a reader/writer such as the Philips® 2X writer/reader or the Kodak 6X Writer/Reader can be used. This pregroove is not a perfect spiral but is wobbled with a typical amplitude of 30 nm and a spatial period of 54 to 64 mm.

Figure 8:
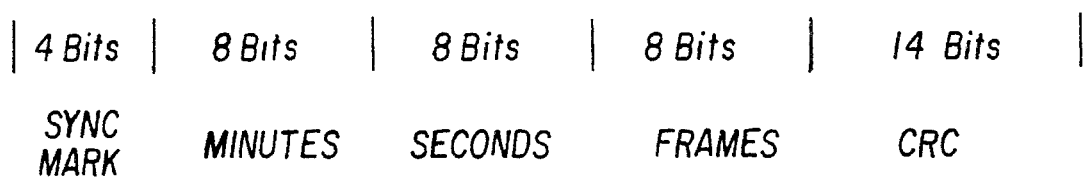
FIG. 8 illustrates the organization of one block of ATIP data on the writable compact disk.

This spiraled wobbled pregroove contains ATIP (Absolute Time in Pregroove) information, such as addressing and other information that are necessary for the write and read processes of the CD-WO writer/reader 12. This ATIP information is encoded in blocks (see FIG. 8) of 42 bits: 4 bits of synchronization mark; 24 bits of address (8 bits of minutes; 8 bits of seconds and 8 bits of frames); and 14 bits of CRC (cyclic redundancy check) which are used for error detection.

Figure 2:
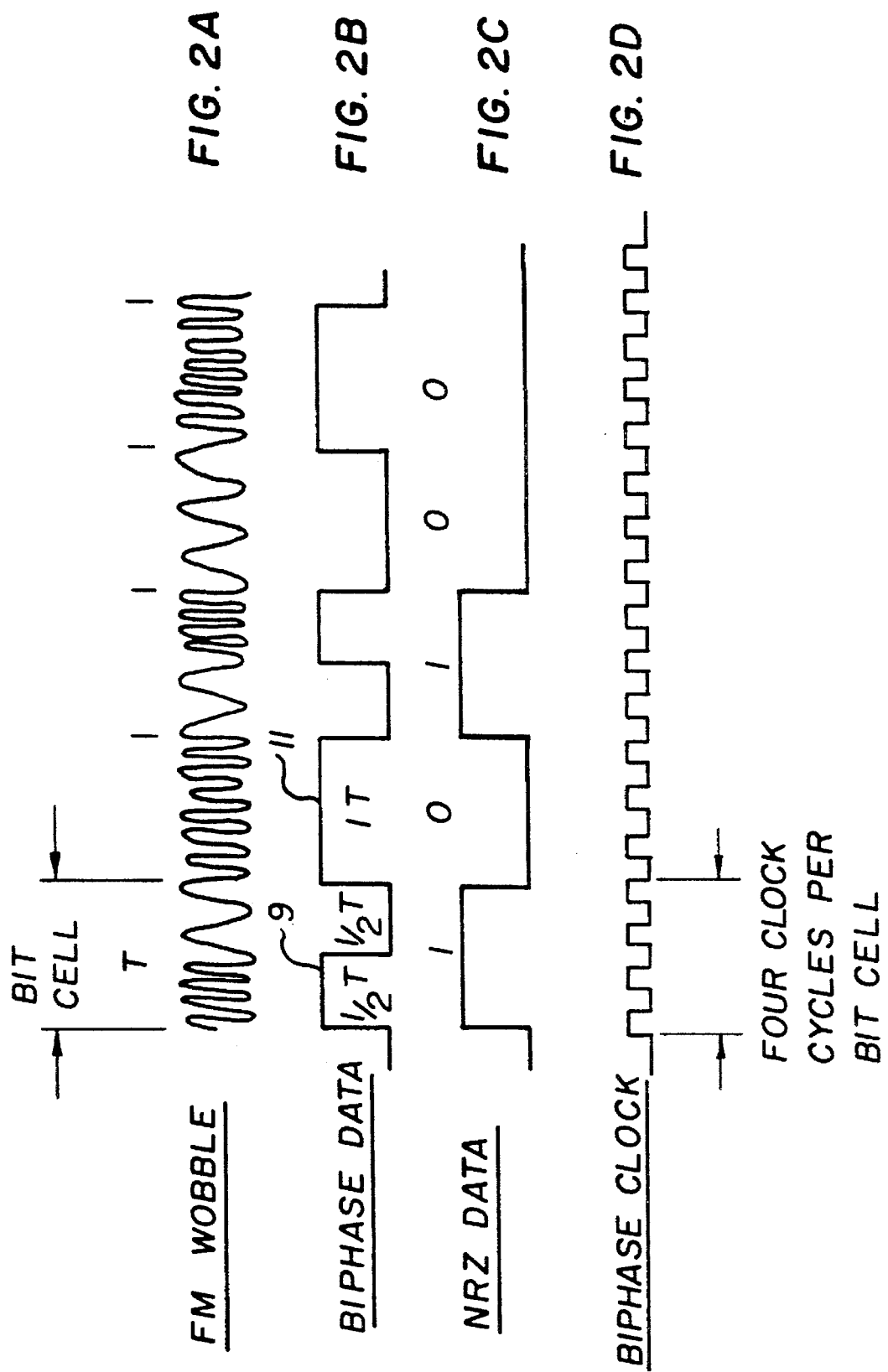
FIGS. 2A–2D illustrate different signals which are used for generating the synchronization signals with the method according to the invention.

A FM (frequency modulated) signal is produced from the reading of the spiral wobbled groove. This signal is shown in FIG. 2A. On this representation the frequency differences have been exaggerated in FIG. 2A to better show the modulation of the signal.

In FIG. 1, the reader/writer 12 includes an optical head 13 which processes light signals reflected from the disk 10 or writes optical data onto the disk 10 preferably in the middle of the wobbled groove. The signal read from the disk 10 is an FM signal which is amplified by an amplifier 14. An ATIP filter 16 responds to the amplified FM signal to produce a narrow band, frequency modulated TTL level signal (the FM modulated signal). The signal issued from the ATIP filter 16 is then sent to a biphase data phase-locked loop (PLL) 20 known as a demodulator in the art which outputs an error voltage which in effect is the phase difference between the frequency modulated input and a voltage controlled oscillator output. The error voltage is processed within the biphase data phase-locked loop 20 and produces biphase data (see FIG. 2B). The biphase data is sent to a biphase clock PLL 24 which recovers a biphase clock (FIG. 2D). For each bit within the biphase data, there are four biphase clock cycles. Every four clock cycles generate a bit cell. The biphase data is then decoded to produce NRZ data (FIG. 2C). This decoding is performed in the ATIP decoder 26 which will be discussed hereafter in detail.

The biphase rules which are typically used for producing the NRZ data (FIG. 2C) are the following: a transition in the middle of a bit cell 9, (FIG. 2B) is a "one"; no transition in a bit cell 11, (FIG. 2B) is a "zero"; a transition must occur at each bit cell edge. Thus "legal" lengths (½T and T) of biphase data normally exist. A third length, designated as "illegal" (1½T) is used to detect a sync mark which will be discussed in detail hereafter. The biphase data is decoded using the biphase clock into NRZ data, (non-return-to-zero data). (U.S. Pat. No. 5,163,035 describes a process for decoding biphase data into NRZ. See column 5, line 32 to line 51.) The NRZ data are registered and checked for errors using CRC. At this point, the NRZ ATIP data is binary coded decimal format; a microprocessor 30 converts the BCD format to binary data for further processing. According to a preferred embodiment, the address information is actually an absolute time on the CD-WO disk 10 that increases monotonically throughout the disk 10. The optical head and associated circuitry read the stamped time code to determine location on the disk 10. To determine where the ATIP data exists, it is necessary to detect a sync mark. In fact, according to a preferred embodiment the end of a sync mark will be detected to indicate the beginning of the address information. The sync mark signal is detected in the ATIP decoder 26 which also receives the biphase clock from the biphase clock phase-lock loop 24. In addition, the ATIP decoder receives a high frequency clock signal from a high frequency phase-lock loop 28 to generate various signals. Address information, ATIP decoder status, as well as microprocessor interrupt signals are provided by the ATIP decoder 26.

Figure 7:
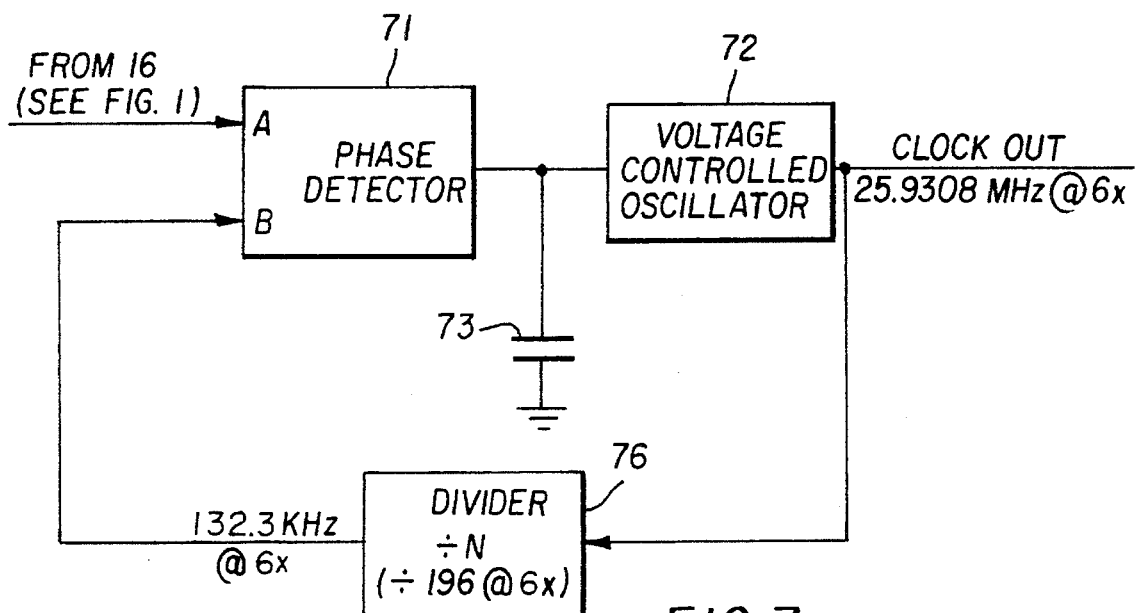
FIG. 7 schematically represents a block diagram of the high frequency phase lock loop of FIG. 1 which generates a high frequency clock for the ATIP subsystem.

With reference to FIGS. 1 and 7, the high frequency phase locked loop 28 provides a clock to the ATIP decoder 26 in order to generate timing signals with respect to the speed of the disk 10. This technique promotes fast disk access and system performance over a wider dynamic range. In FIG. 7, the FM wobble signal (FIG. 2A) (132.3 KHz at 6X) is input to the "A" input of the phase detector 71 of the high frequency PLL 28. The phase detector compares the wobble signal input to the feedback clock (the "B" input) generated by the voltage controlled oscillator (VCO) 72 and divide by-N circuit 76. The phase detector 71 outputs a pulse which is the difference in phase of the two input signals. The pulse is filtered by a loop filter (shown as a capacitor) 73 which controls the response of the PLL to perturbations. The filtered pulse is a control voltage because a change in the control voltage level causes a change in the frequency of the VCO 72 to correct for any phase error determined by the phase detector. The output frequency of the VCO (72) at 6X is 25.9308 MHz. The divide by-N 76 is necessary in the feedback loop to obtain the correct feedback frequency for the phase detector 71. The frequency response of the high frequency PLL 28 is quite low to establish an extremely stable output clock and prevent the PLL from responding to the frequency modulation of the input signal.

Figure 3:
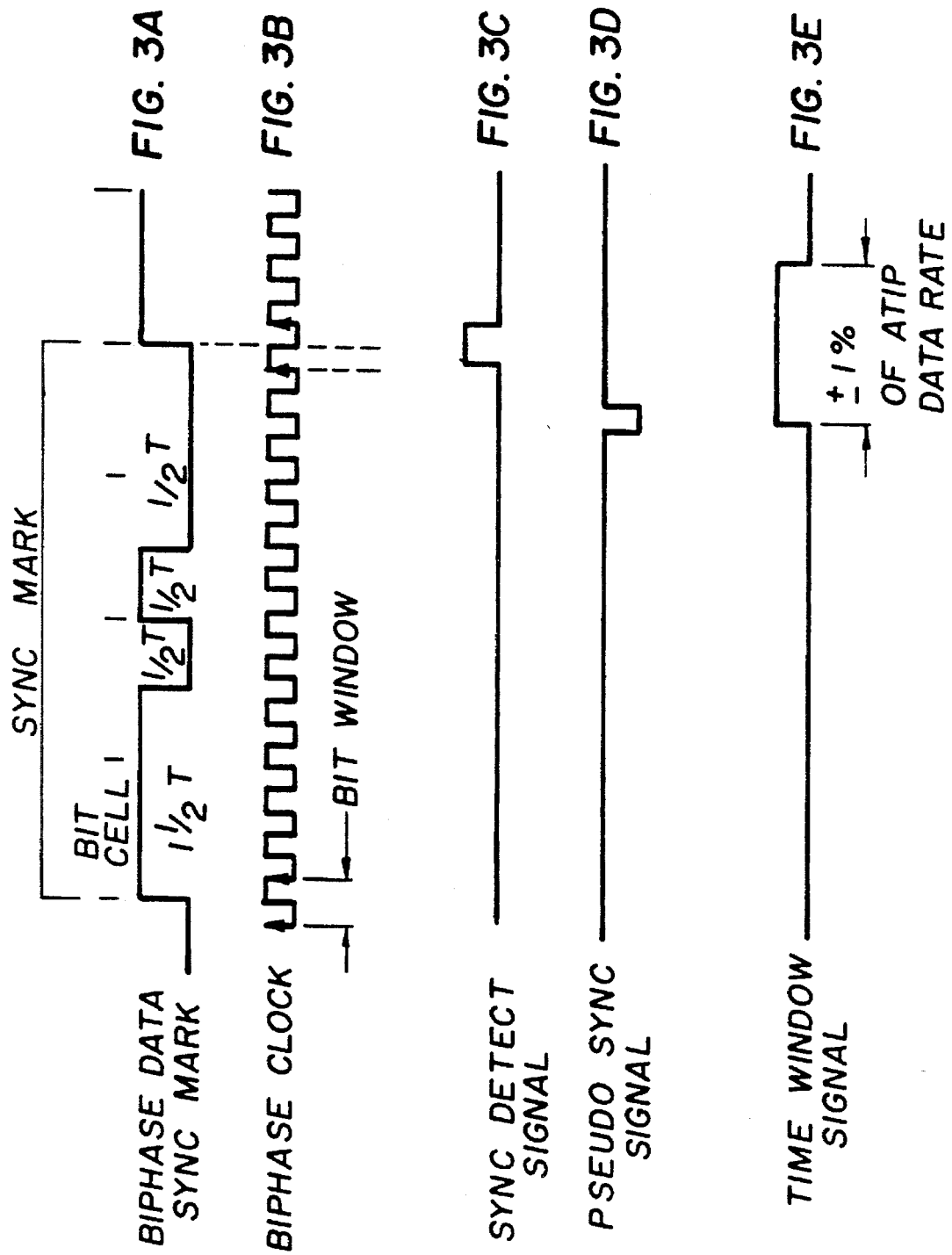
FIGS. 3A–3E represent different signals illustrating the generation of synchronization signals according to the invention.
Figure 4:
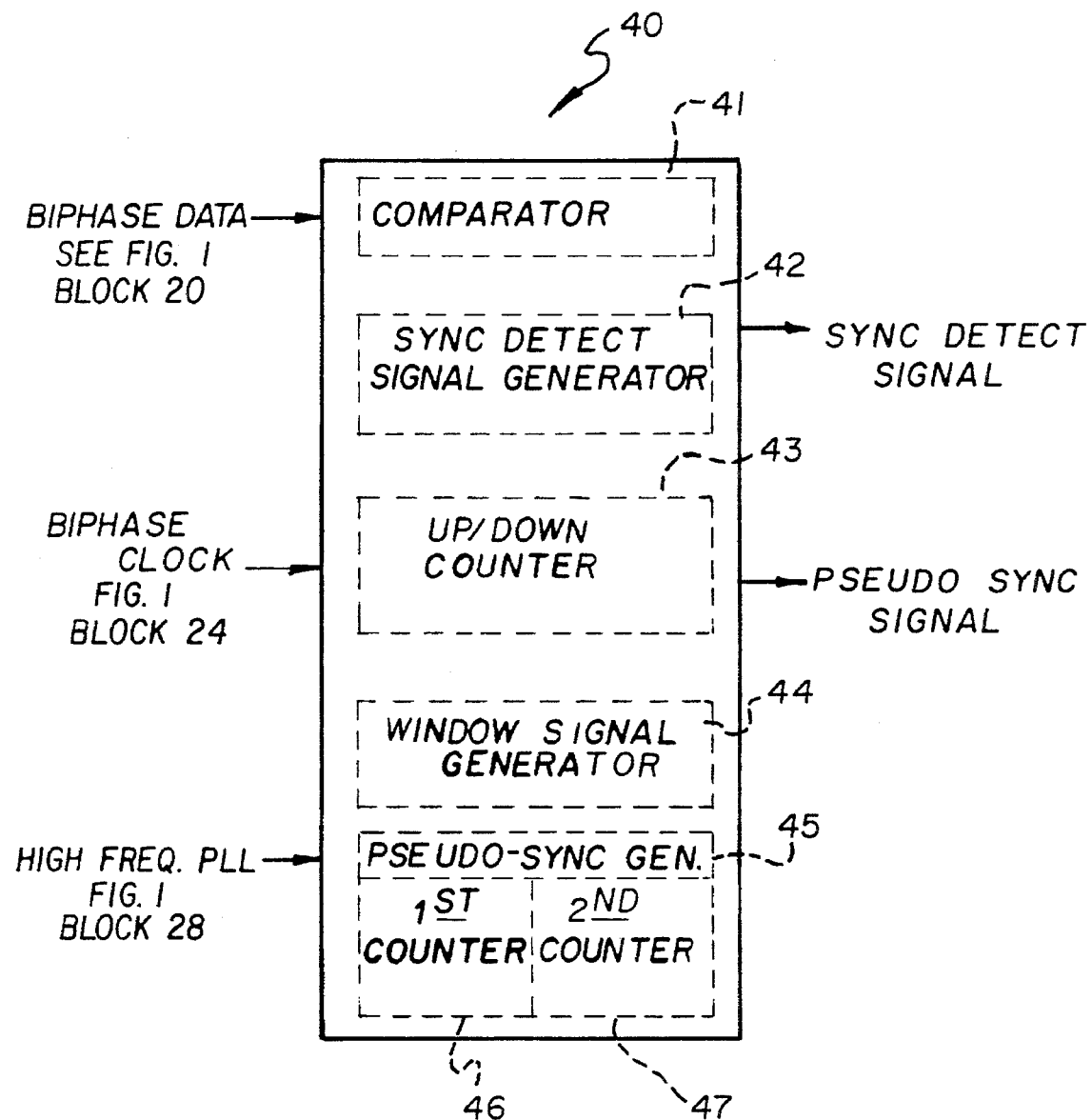
FIG. 4 schematically represents a block diagram of the sync detection block which is part of the ATIP decoder.

As shown in FIG. 3A, and as already mentioned, the sync mark is detected by using a third "illegal" length (1½T) for coding the sync mark signal, the other data in a block being coded by using two "legal" lengths (1T; ½T). The sync detection block 40, as illustrated in FIG. 4, in response to the biphase data and the biphase clock signal, outputs a sync detect signal (FIG. 3C) after the end of the sync mark signal of a given block (FIG. 3A) and also a pseudo-sync signal (FIG. 3D) which occurs in the next block at a predetermined time after the end of the sync detect signal. Typically, for a 6X writer, the pseudo-sync signal is generated approximately 2.19 ms after the sync detect signal occurs. This pseudo sync signal is a continuously repeatable signal which occurs regardless of whether the system sees a sync detect signal or not. Such a pseudo-sync signal indicates that a previous block has been completed and permits the loading of the registers internally in the ATIP circuitry so that the microprocessor can read the registers.

Typically, as shown in FIG. 4 the sync detection circuit 40, which is pan of the ATIP decoder 26, comprises a digital comparator circuit 41 that recognizes the sync mark pattern and generates a sync detect signal (FIG. 3C) after the end of the sync mark signal by means of a sync detect signal generator 42. According to a preferred embodiment, the sync detect signal occurs shortly before the physical end of the sync mark (for example, about 6.6 μs @ a 6x CD rate before the physical end of the sync mark signal). As a way of example, the sync detection circuitry consists of a 16 bit shift register and a 16 bit magnitude comparator. As the biphase data in FIG. 2B is clocked into the comparator, the comparator 41 looks for a pattern similar to a predetermined sync mark. If a pattern match occurs, a sync detect pulse (FIG. 3C) is output. For example, for a 6X CD data rate, the sync detect signal should occur every 2.22 ms.

The sync detect signal is an unprocessed signal, therefore, false sync detect signals due to noise or misplaced data edges may occur. Conversely, sync mark signals may not be detected for the same reasons. To increase reliability and ATIP channel robustness, the sync detect signal is subjected to some scrutiny. First, for a given block of information, a time window signal (FIG. 3E) is developed from a valid sync detect signal in the block of information preceding the given block. The window signal is generated by a window signal generator 44 (in FIG. 4) and is designed to occur in the exact location where the next valid sync detect signal should occur. The window width, according to a preferred embodiment, is equivalent to ±1% of the nominal data rate. If the sync detect signal does not occur in the window, the sync detect signal is assumed to be invalid and is ignored. Such a procedure is illustrated in FIGS. 5A–C where an invalid detect signal 31 (i.e. outside the time window signal) is ignored.

Figure 5:
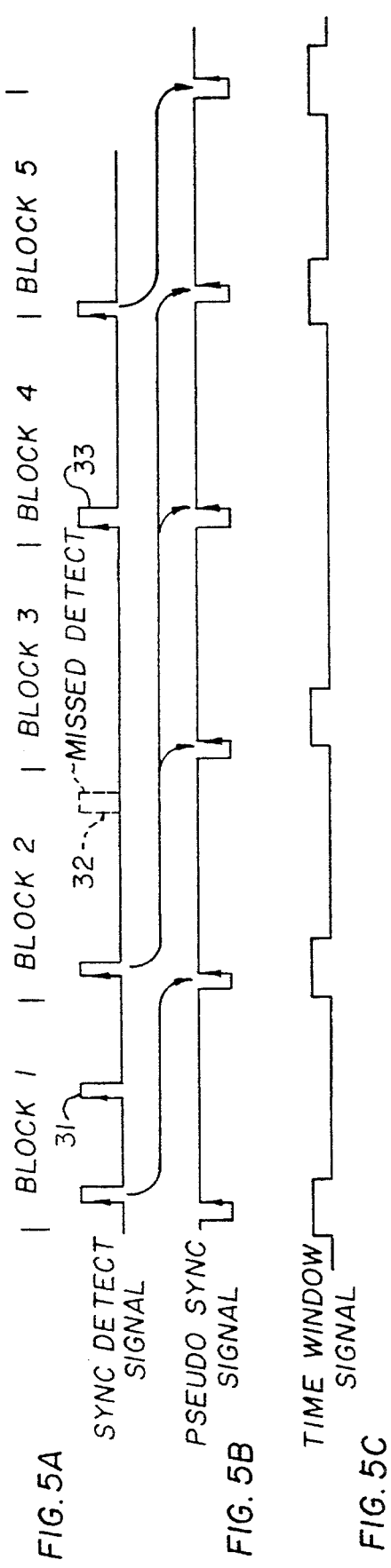
FIGS. 5A–C show a timing diagram illustrating the process used for generating synchronization signals from missing or invalid sync detect signals.
Figure 6:
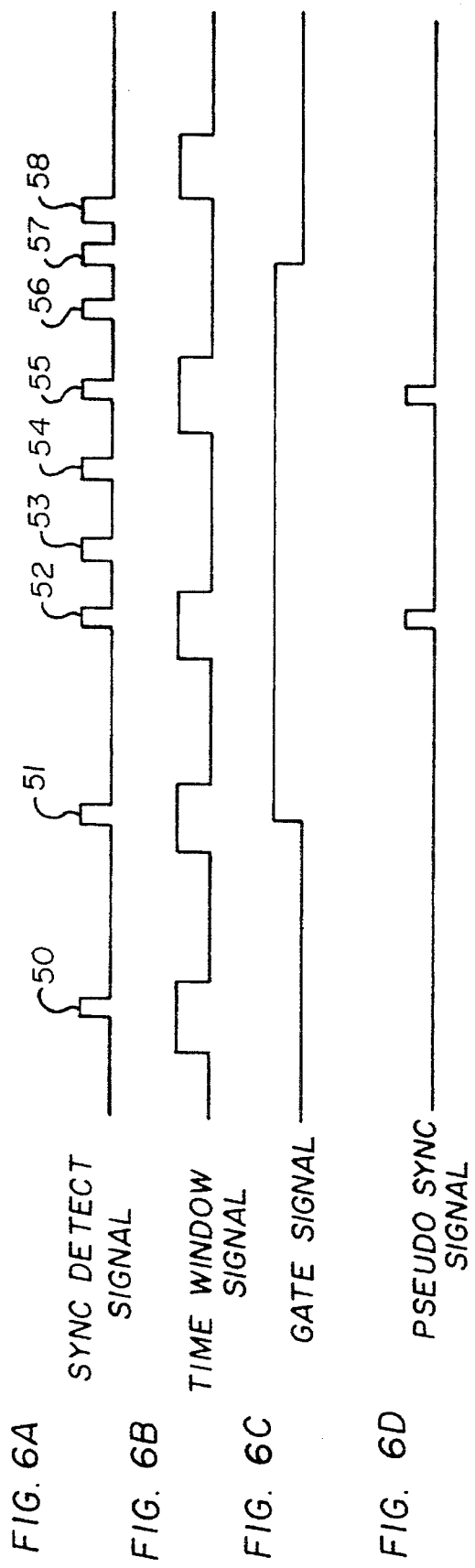
FIGS. 6A–D show a timing diagram illustrating the windowing strategy used in accordance with the present invention.

As can be seen, the sync detect signals in FIGS. 5A–C of a given block n is used to produce the pseudo-sync signal of the block n+1. Preferably, the pseudo-sync signal of the block n+1 is generated prior to the sync detect signal corresponding to the block n+1. As shown in FIGS. 5A–C there is a missed sync detect signal 32 for block 3. In this case, as already explained, the pseudo sync signal is generated from the last valid sync detect signal, i.e. the sync detect signal of block 2. As it appears in FIGS. 5A–C, the invalid or missed sync detect signal 32 generates no time window signal, so that the sync detect signal 33 in block 4 is not considered as valid (since it doesn't occur during a window signal). Accordingly, the pseudo-sync signal of block 5 is also generated from the sync detect signal of block 2. These pseudo-sync signals are generated by a pseudo-sync generator 45 (see FIG. 4) which, in fact, includes two counters, first counter 46 and second counter 47. In order for the microprocessor to read the status registers which will be discussed in detail hereafter, and for the EFM (eight out of fourteen modulation) encoder to initiate a write sequence if needed, circuitry is necessary to generate a continuously occurring pseudo-sync signal from each sync detect signal. To do this, the sync detect signal is provided as an input to counter 46. At its predetermined terminal count, an ATIP pseudo-sync pulse is output. If a sync mark is not detected, the second counter 47, which is linked to the last valid sync detect signal, runs to its predetermined terminal count and injects an ATIP pseudo-sync signal until a valid sync detect signal occurs or until the microprocessor determines that too many consecutive sync marks were missed. In this case, the microprocessor indicates a system error which stops the writing/reading process.

Also shown in FIG. 4, as an input signal of the circuit 40, is the high frequency PLL which provides a high frequency clock for timing generation and acts as a reference clock. Typically, for a 6X writer, its frequency is 12.9 MHz.

Advantageously, and as shown in FIG. 4, the up/down counter 43 is configured to provide an additional level of filtering by setting a requirement of a predetermined number of valid sync detect signals before starting to write/read on the disk 10. To end an up/down counter 43 is decremented if a sync detect signal occurs outside the window or incremented if the sync detect occurs within the window. This is illustrated in FIGS. 6A–D of the present description. The up/down counter 43 is first initialized to a programmed state which is incremented each time a valid sync detect signal is detected and decremented each time an invalid or missing sync detect signal is detected.

Turning now to FIGS. 6A–D, the up/down counter 43 increments to a specified threshold count at which it resets to the programmed state if a string of valid sync detect signals occur in the appropriate location; i.e. inside the time window. Once a given number of valid sync detect signals occur (2 in the example shown in FIGS. 6A–D), a gate signal is opened which allows the next valid sync detect signal to initiate the write or read cycle. In FIGS. 6A–D, valid sync detect signals are 50, 51, 52, 55 and invalid sync detect signals are 53, 56, 57, 58. If a string of valid sync detect signals is not detected in the appropriate location, the up/down counter 43 in FIG. 4 decrements for each missing or invalid sync detect signal. When the zero count is reached, the circuitry inhibits any sync detect signal output to the ATIP pseudo-sync generator 45 by closing the gate. This condition is detected by the microprocessor 30 (in FIG. 1) and consequently, the "write" or "read" process is stopped. The main feature of the up/down counter is actually performed during initialization. In the example shown in FIGS. 6A–D, the counter requires two valid sync detect signals (50, 51) to occur in succession before the ATIP pseudo-sync generation circuit is allowed to synchronize. This requirement prevents synchronization on false sync detect signal detection.

As shown in FIG. 1, the ATIP decoder (26) block is also used for generating a servo sync signal which is used to provide additional control of the spindle speed of the writer/ reader while writing. Such a servo sync track signal provides means to control the phase difference between the sync detect signal and the EFM encoder sync signal while writing on the disk 10.

The ATIP decoder 26 also generates the address information and status information necessary for the microprocessor 30 to determine whether a problem exists. The ATIP decoder 26 includes a biphase-NRZ decoder (mentioned heretofore), status and address registers (minutes; seconds; frames) and CRC circuitry which flags a status bit each time an error is detected in the address. The ATIP decoder 26 decodes the address information provided by the biphase data PLL 20 and by the biphase clock PLL 24 and provides status information to the microprocessor 30. From that status and address, the processor determines whether writing should be started, stopped or continued. To this end, a counter (not shown) in the microprocessor 30 is used which is incremented each time a good valid address with a proper status is seen by the ATIP decoder 26 and decremented each time a poor status or invalid address is seen by the ATIP decoder 26. When the microprocessor counter reaches the zero count, the microprocessor stops the writing process. A system error is indicated. A write sequence is started once a predetermined count has been reached. According to one embodiment, a write sequence is started as soon as the counter contains a value different from zero.

The invention which has been described in detail in the foregoing description is particularly advantageous in that it provides the capability to process and detect the ATIP synchronization marks at a 2X or a 6X CD rate. The circuitry also provides means to eliminate false sync detection by generating a ±1% window signal around the desired location of a sync detect signal. Last but not least, the circuitry provides means to generate an uninterrupted pseudo-sync signal from an actual sync mark detection. The pseudo-sync signal occurs in the appropriate location, even if no valid sync detect signal is detected.

While the invention has been described with particular reference to a preferred embodiment, it will be understood by those skilled in the art that various changes may be made and equivalents may be substituted for elements of the preferred embodiments without departing from the claimed invention.

PARTS LIST 9 bit cell
10 disk
11 bit cell
12 reader/writer
13 optical head
14 amplifier
16 ATIP filter
20 biphase data phase-locked loop (PLL)
24 biphase clock phase-lock loop
26 ATIP decoder
28 high frequency PLL
30 microprocessor
31 invalid sync detect signal
32 missed sync detect signal
33 sync detect signal
40 sync detection block
41 digital comparator circuit
42 sync detect signal generator
43 up/down counter
44 window signal generator
45 pseudo-sync generator
46 first counter
47 second counter
50 valid sync detect signal
51 valid sync detect signal
52 valid sync detect signal
53 invalid sync detect signal
54 invalid sync detect signal
55 valid sync detect signal
56 invalid sync detect signal
57 invalid sync detect signal
58 invalid sync detect signal PARTS LIST (cont'd)

71 phase detector
72 voltage controlled oscillator
73 loop filter
76 divide by-N circuit

We claim:

1. A method for detecting and processing sync marks and address information extracted from a prerecorded wobbled groove formed in a compact disk in order to produce pseudo-sync signal, each pseudo-sync signal enabling a writing/reading sequence on the compact disk of an associated writer/reader, the prerecorded wobbled groove having a plurality of blocks of information, the method comprising the steps of:

(a) extracting an FM signal from the wobbled groove when the disk is rotatably driven and convening such FM signal into biphase data;

(b) extracting a clock signal from the biphase data;

(c) providing a high frequency phase-lock loop which responds to the extracted FM signal;

(d) providing an ATIP decoder which in response to the biphase data, biphase clock, and high frequency clock signal provides the following:

(i) detecting in each block of information a predetermined sequence of biphase data representing a sync mark by using the clock signal and the biphase data to produce a sync detect signal;

(ii) generating a time window signal in which, for a given block of information, a valid sync detect signal is expected to occur, the time window signal being generated from a valid sync detect signal of the block preceding the given block; and (iii) in response to a valid sync detect signal detected within the window signal of a given block of information, generating a pseudo-sync signal in the next block of information;

(iv) in the case of no valid sync detect signal within the window signal of the given block of information, generating a pseudo-sync signal for the next block of information from the last valid sync detect signal; and (e) indicating a system error when a predetermined number of sync detect signals are not detected within their corresponding time window signal.

2. The method of claim 1 comprising the further step of detecting a predetermined number of valid sync detect signals before generating a pseudo-sync signal.

* * * * *